Nov. 8, 1927.     1,648,369
T. SVEDBERG ET AL
ANALYTICAL CENTRIFUGE
Filed Sept. 10, 1923     2 Sheets-Sheet 1

Inventors
The' Svedberg
J. Burton Nichols

Nov. 8, 1927.

T. SVEDBERG ET AL 1,648,369

ANALYTICAL CENTRIFUGE

Filed Sept. 10, 1923    2 Sheets-Sheet 2

Inventors
The' Svedberg
J. Burton Nichols
By Chindell Parker Karlson
atty

Patented Nov. 8, 1927.

1,648,369

UNITED STATES PATENT OFFICE.

THEODOR SVEDBERG, OF UPSALA, SWEDEN, AND JAMES B. NICHOLS, OF MADISON, WISCONSIN.

ANALYTICAL CENTRIFUGE.

Application filed September 10, 1923. Serial No. 661,814.

The invention relates to a method and apparatus for investigating colloidal substances and the like, and has particular reference to an improved centrifuge whereby the minimum size of the particles and the total volume of the different sized particles in the disperse phase of a colloidal solution can be determined.

Heretofore the average diameter of the particles in a colloidal solution has commonly been determined by the use of the ultra microscope whereby the number of particles present in a given volume of the solution can be counted. After determining the density and the mass of a unit volume of colloid, the average volume and diameter of a single particle can be calculated. This method is complicated and requires a considerable period of time for making a determination. The ultra microscope is furthermore an expensive instrument, and is not entirely satisfactory for examining an emulsion, or other material having low power of scattering light. The average size of the particles which constitute the disperse phase of a colloidal suspension or emulsion can also be determined by ultrafiltration, but this method is very slow and complex and its accuracy is affected by the charge of the sol.

The application of colloid chemistry in the industries, for example the rubber, paint and dye industries, is becoming more and more prominent, and to become practical it is necessary that means be provided for easily and quickly examining colloidal substances. The primary object of the invention therefore is to provide a means for easily and quickly determining the size of the particles constituting the disperse phase of a colloidal substance.

A further object is to provide an inexpensive device which is simple in construction and operation for examining colloids, and with which the size of extremely small particles can be accurately determined.

Another object is to provide a means whereby the volumes of the different sized particles in a non-uniform sol can be quickly and accurately determined. Data of this character have heretofore been commonly obtained by gravity settling methods, such as Oden's method of sedimentation in which the rate of settling is determined by electrical weighing means, but such methods require considerable time and the accuracy of their results is susceptible of variations due to changes in the temperature and other factors.

A further object is to provide a short and simple method for accurately determining the minimum size of the particles constituting the disperse phase of a colloidal substance, and for determining the volumes of different sized particles in a non-uniform colloid.

The invention comprises generally revolving an elongated tube containing the colloid under investigation periodically and transversely through a narrow pencil of uniform light at a speed sufficient to form a continual image of the illuminated tube at the point of observation, and noting the rate at which the suspended particles move toward the outer end of the tube. The minimum radius of the particles can then be calculated by using a modified form of Stokes law for centrifuges. When it is desired to determine the volumes of the different particles in a non-uniform colloid, the image of the illuminated tube is photographed to record the variation of light absorption along its length at a given time and speed, and the relative intensity of light represented on the photograph is determined by the use of a photometer. These values are then compared to those obtained from a known standard, such as a photograph of a wedge cell containing a similar colloid of known concentration, whereby the variation in concentration of the particles throughout the length of the tube can be ascertained for the purpose of calculating the volumes of the different sized particles in the colloid.

Ancillary objects and advantages will become apparent as the description proceeds.

In the accompanying drawings, Figure 1 is a perspective view of a device embodying the features of our invention.

Figure 1:
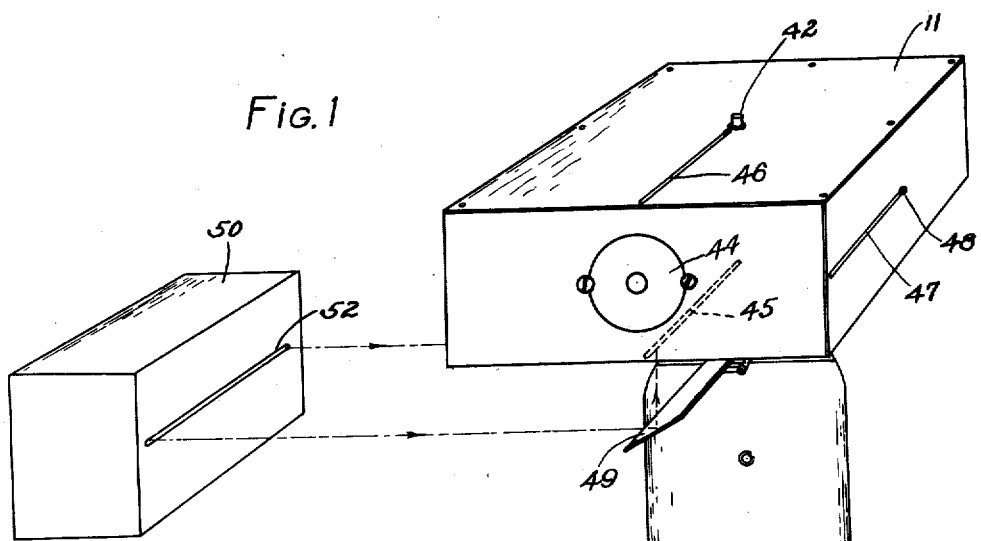
Figure 6:
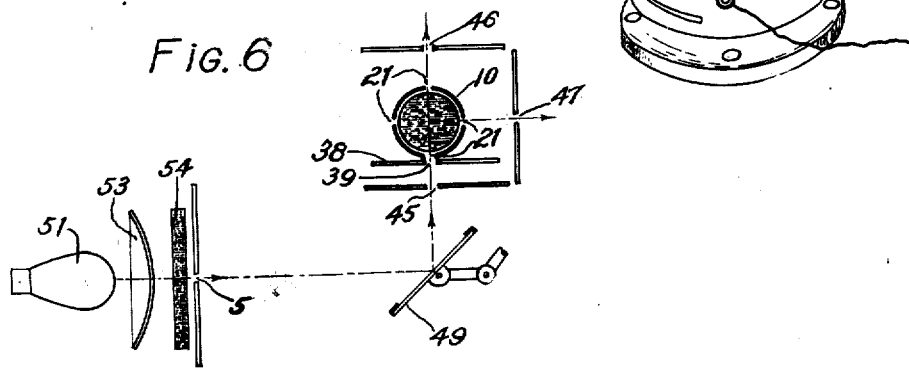
Fig. 6 is a diagrammatic view illustrating the manner in which the device operates.
Figure 2:
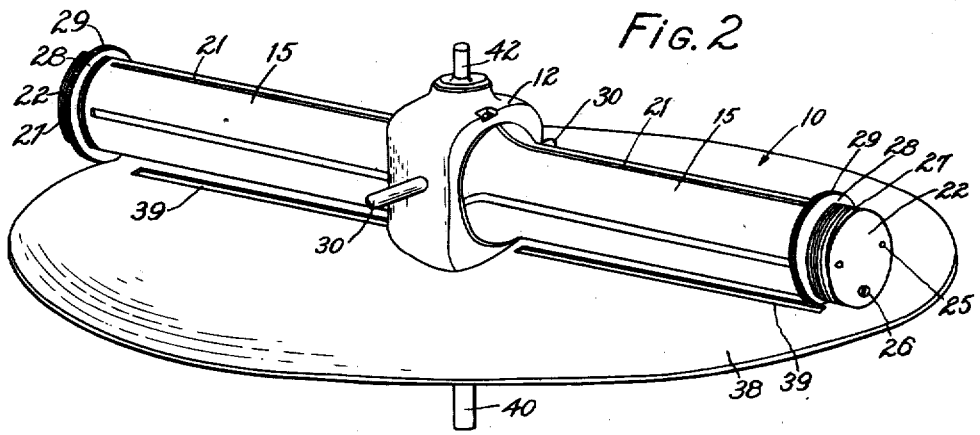
Fig. 2 is an isometric view of the rotor.
Figure 3:
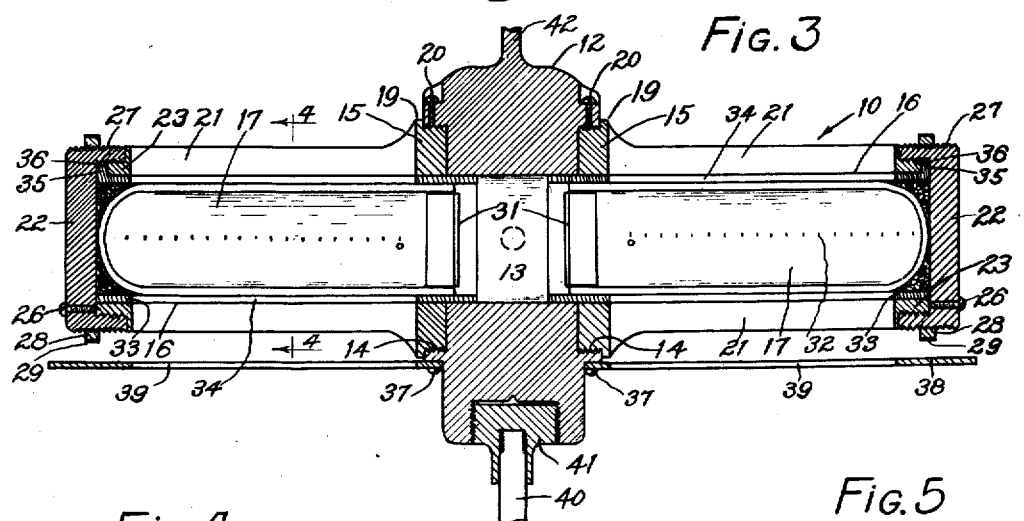
Fig. 3 is a longitudinal vertical section of the rotor.

While our invention is susceptible of various modifications and alternative constructions, and may be advantageously employed for various purposes, we have illustrated in the drawings and will herein describe in detail the preferred embodiment which is particularly adapted for examining colloids, but it is to be understood that we do not thereby intend to limit the invention but aim in the subjoined claims to cover all legitimate modifications and alternative constructions falling within the spirit and scope of the invention.

In its exemplary embodiment, the invention comprises generally a rotor 10 which is mounted within a darkened chamber, such as the closed box 11, and connected therein to a suitable driving means; and which is adapted to rapidly revolve the substance to be investigated through a narrow pencil of parallel waves, such as light rays or X-rays, for repeatedly illuminating the substance.

The rotor 10 comprises a flat metallic head 12 laterally through which extends a central bore 13, of which the ends are enlarged and screw-threaded as indicated at 14. Threaded into each end of the bore 13 is a laterally extending arm 15 which is preferably cylindrical in shape and is formed with a longitudinal bore 16 for housing a transparent tube 17 adapted to contain the substance 18 under investigation. Each arm 15 is provided with a peripheral flange 19 adjacent its inner end for engaging one side of the head 12. Set screws 20 in the head 12 are adapted to engage the inner threaded ends of the arms 15 to hold them firmly in position. Each arm 15 is formed with radial slots 21 extending substantially throughout its length at the sides and at the top and bottom to allow for the vertical or horizontal illumination of the enclosed tubes 17.

The outer ends of the arms 15 are closed by screw caps 22 which are adjustably threaded onto reduced shanks 23 on the arms. Each cap 22 is formed with a plurality of holes 25 in its outer face whereby its position may easily be adjusted, and is provided with a set screw 26 for locking it against unwarranted movement. The outer peripheral surface of each cap 22 is threaded, as indicated at 27, for adjustably supporting a balancing ring 28 having a knurled surface 29. Pivot members 30 extend from opposite sides of the head 12, and are adapted to temporarily support the rotor 10 while the rings 28 are being adjusted.

The tubes 17 which in the present instance are made of pyrex glass are formed with closed rounded outer ends and are sealed at their inner ends with paraffin corks 31. If desired, the tubes 17 may be provided with suitable graduations 32 underlying the longitudinal slots 21 in the arms 15. Preferably the tubes 17 are positioned within metallic tubes 33 which are open at both ends and extend through the bores 16 into the head 12. The tubes 33 are formed with longitudinal slots 34 which are similar to and underlie the slots 21. To prevent the slots 21 and 34 from moving out of registration, the tubes 33 are provided at their outer ends with upwardly extending projections 35 which engage notches 36 in the ends of the reduced portions 23.

Secured to the head 12 by screws 37 below the arms 15 is an opaque disk 38 having a pair of elongated slots 39 which register with the vertical slots in the arms 15 and tubes 33.

The lower end of the head 12 is mounted upon the upper end of a drive shaft 40 by means of a suitable intermediate connecting member 41. On its upper edge the head 12 is formed with a stub shaft 42 which is suitably journaled in the upper wall of the box 11. While any suitable means for driving the shaft 40 may be employed, we have herein illustrated a high speed Dumore motor 43.

The box 11 for enclosing the rotor 10 may be of any suitable shape, and is preferably mounted on the upper end of the motor casing. A circular plug 44 is positioned in the front wall of the box 11, and may be removed when the caps 22 are to be unscrewed and the tubes 17 are to be changed.

Means is provided for passing a narrow pencil of light through the box 11. In the present instance, the upper and lower sides of the box are provided with elongated slots 45 and 46 which are arranged to register with the vertical slots 21 in the arms 15 when the latter pass between them. An elongated slot 47 in a side wall of the box 11 is adapted to register at the same time with the lateral slots 21 in one of the arms 15. The slot 47 is provided with a slider 48 whereby it may be closed when the tubes 17 are to be viewed through the slot 46. Adjustably mounted on the underside of the box 11 below the slot 45 is a directing means, such as an elongated mirror 49, which is adapted to continually reflect a vertical pencil of suitable light through the slots 45 and 46.

Any suitable source of light may be employed. In the present instance we have shown a closed chamber 50 enclosing an incandescent lamp 51 and having a longitudinal slot 52 for sending out a narrow pencil of light. A lens 53 and a water cell 54 are positioned between the lamp 51 and the slot 52.

The operation is as follows: A like amount of the material to be studied is placed in each tube 17. The tubes 17 are then accurately positioned in the arms 15, and are revolved at a rapid speed, thereby subjecting the material 18 to centrifugal force. When passing the slots 45 and 46, the tubes are illuminated by a narrow stream of light entering the chamber 11 through the slot 45. The speed of the rotor 10 is sufficient to form a continual image of the illuminated tubes at the slots 46 or 47. If the image is observed at the slot 47, a stream of light may also be sent into the chamber 11 through slot 46. When observing the image at the slot 46, the slot 47 is closed.

Figures 4, 5:
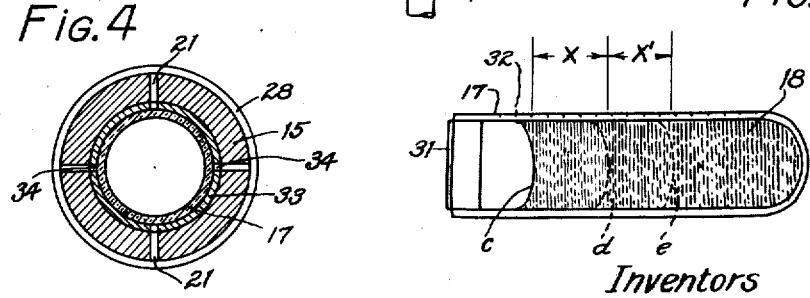
Fig. 4 is a view taken along line 4—4 of Fig. 3.
Fig. 5 is a detail view of the tube containing the colloid.

By revolving the arms 15, the material 18 is made to assume a position in the outer end of each tube with its inner surface represented by the meniscus $c$ (see Fig. 5) and the suspended particles in the material 18 are forced to move outwardly. The rate of this movement depends upon the size of the particles and the speed of the rotor, and the innermost position of the minimum sized particles is indicated by the meniscus $d$. When particles of two sizes are present, a second meniscus $e$ indicating the innermost position of the coarser particles sometimes appear. The letters $x$ and $x'$ indicate the distances between the meniscus $c$, $d$ and $e$. Each meniscus can be observed in the image at the slot 36 or 37, and the distance which it has moved can be accurately read.

Readings of the distances through which the particles have moved are taken at regular intervals of time. The radius of the minimum sized particles can then be calculated with the aid of a modified form of Stokes law applicable to centrifuges, which law is expressed by the following equation:

$$r = \sqrt{2.303 \log \frac{x+a}{x} \cdot \frac{9}{2} \frac{n}{sw^2 t}}$$

wherein
$r$ = radius in $\mu\mu$ of minimum sized particles.
$a$ = distance in cm. of the meniscus $c$ from the center of rotation.
$x$ = distance in cm. through which the minimum sized particles have moved.
$n$ = viscosity of the liquid.
$s$ = difference in density of the colloid and dispersion medium
$w$ = angular velocity in radians.
$t$ = time in seconds.

To illustrate, the following results were obtained from runs on a gold sol and a clay sol:

Gold sol.

| $a$ | $w$ | $n$ | $s$ | $x$ (cm.) | $t$ (sec) | $r$ ($\mu\mu$) |
|---|---|---|---|---|---|---|
| 2.0 | 58$\pi$ | .01 | 18.32 | .3 | 900 | 35.1 |
|  |  |  |  | .7 | 1800 | 34.0 |
|  |  |  |  | .9 | 2820 | 32.6 |
| Av. |  |  |  |  |  | 33.9 |

Clay sol.

| $a$ | $w$ | $n$ | $s$ | $x$ (cm.) | $t$ (min) | $r$ ($\mu\mu$) |
|---|---|---|---|---|---|---|
| 2.4 | 58$\pi$ | .01 | 1.6 | .24 | 75 | 41.7 |
|  |  |  |  | .30 | 90 | 42.1 |
|  |  |  |  | .35 | 105 | 42.1 |
|  |  |  |  | .40 | 120 | 41.9 |
|  |  |  |  | .45 | 135 | 41.9 |
| Av. |  |  |  |  |  | 41.94 |

The concentration of the particles increases from the meniscus $d$ to the outer end of the tube 17. To determine the volumes of the different sized particles in a non-uniform colloid, the image at the slot 46 is photographed, and the relative intensity of the light passing through the tubes 17 at different points along their length is measured from the photograph by means of a suitable photometer. The variable concentration of particles at different points along the length of each tube 17 is then determined by comparing the photometer readings with other readings obtained from a known standard, such as a photograph of a wedge cell containing a similar colloid of known concentration. After the variation in concentration is known for a given time and speed, the volumes of the different sized particles can be calculated in any suitable way.

It will be apparent that we have provided a simple and inexpensive device for quickly and accurately studying colloidal solutions and the like. The device is capable of measuring the sizes of extremely small particles, and is well adapted for use in the research laboratory or in the industries.

We claim as our invention:

1. An analytical centrifugal having in combination, a head, a plurality of transverse arms supported by said head, said arms being provided with longitudinal slots at their top and bottom, an elongated transparent tube positioned in each arm and adapted to contain a plural phased substance, means for revolving said head, and means for periodically sending a pencil of light through said slots to illuminate said tubes.

2. An analytical centrifuge having, in combination, a closed chamber, a head mounted in said chamber, a laterally extending arm supported by said head, a transparent tube mounted in said arm, means for revolving said head, and means for periodically illuminating said tube.

3. An analytical centrifuge having in combination, a motor, a closed chamber supported by said motor, a rotor connected by the motor shaft in said chamber, a transparent container carried by said rotor, slots in the walls of said chamber and said rotor, said slots being adapted to be moved periodically into registration, and means for directing light rays through said slots to illuminate said container.

4. A centrifuge having, in combination, a head, an arm carried by said head, said arm having a plurality of longitudinal slots, a tube positioned in said arm and having longitudinal slots registering with the adjacent slots in said arm, a closed tube positioned in said first mentioned tube, means for retaining said closed tube in position, means for revolving said head, and means for sending a beam of light through said slots to illuminate said closed tube.

5. An analytical centrifuge having, in combination, a closed chamber, means for continually sending a narrow beam of light through said chamber, a head mounted in said chamber, a pair of arms mounted on said head, a closed container mounted in each arm, means for revolving said head to move said arms periodically through said beam of light, and slots in said arms for directing light through said container in either of two directions.

6. An analytical centrifuge having, in combination, a container, means for revolving said container, and means for illuminating said container, said last mentioned means serving to produce a fixed image of said illuminated container.

7. An analytical centrifuge having, in combination, a closed chamber, means for directing a beam of light through said chamber, an elongated transparent container in said chamber, and means for revolving said container periodically and transversely through said pencil of light.

8. An analytical centrifuge having, in combination, a closed tube, means for revolving said tube, and means for periodically illuminating said tube.

9. An analytical centrifuge having, in combination, a closed chamber, a transparent tube mounted in said chamber and adapted to contain a poly phase solution, means for revolving said tube, and means for illuminating said tube to show the innermost position of the disperse phase of said solution.

10. An analytical centrifuge having, in combination, a darkened chamber, a closed transparent tube in said chamber, means for directing a narrow sheet of light into said chamber, means for revolving said tube through said sheet of light.

11. An analytical centrifuge having, in combination, a head, an arm carried by said head and having a longitudinal slot, an elongated tube carried in said arm and adapted to contain a colloid, means for revolving said head, and graduations on said tube for indicating the variable concentration of the disperse phase at different points along the tube.

12. An analytical centrifuge having, in combination, means for subjecting a colloidal material to centrifugal force, and means for indicating at all times while said first mentioned means is operative the relative distribution of the particles constituting the disperse phase toward the outer limit of the dispersion medium.

13. An analytical centrifuge having, in combination, means for subjecting a colloidal material to centrifugal force, and means for periodically passing a beam of light through said substance to show the position of the particles constituting the disperse phase.

14. A process for studying colloidal substances comprising subjecting the substance to centrifugal force, and directly measuring while said force is being applied the rate at which the particles constituting the disperse phase move outwardly in said dispersion medium.

15. A process for studying colloidal substances comprising subjecting the substance to centrifugal force, and directly measuring while said force is being applied the relative distribution of the particles constituting the disperse phase in said dispersion medium.

16. A process for studying colloidal substances comprising placing said substance in a transparent container, revolving said container at a high speed to subject said substance to centrifugal force, periodically illuminating said substance at a fixed point in its path of revolution, said speed of revolution being such that a continuous image is substantially produced at said fixed point, and measuring said image while said substance is subjected to said centrifugal force to measure the relative distribution of the particles constituting the disperse phase in said dispersion medium.

In testimony whereof we have hereunto affixed our signatures.

THEODOR SVEDBERG.
JAMES B. NICHOLS.

for sending a beam of light through said slots to illuminate said closed tube.

5. An analytical centrifuge having, in combination, a closed chamber, means for continually sending a narrow beam of light through said chamber, a head mounted in said chamber, a pair of arms mounted on said head, a closed container mounted in each arm, means for revolving said head to move said arms periodically through said beam of light, and slots in said arms for directing light through said container in either of two directions.

6. An analytical centrifuge having, in combination, a container, means for revolving said container, and means for illuminating said container, said last mentioned means serving to produce a fixed image of said illuminated container.

7. An analytical centrifuge having, in combination, a closed chamber, means for directing a beam of light through said chamber, an elongated transparent container in said chamber, and means for revolving said container periodically and transversely through said pencil of light.

8. An analytical centrifuge having, in combination, a closed tube, means for revolving said tube, and means for periodically illuminating said tube.

9. An analytical centrifuge having, in combination, a closed chamber, a transparent tube mounted in said chamber and adapted to contain a poly phase solution, means for revolving said tube, and means for illuminating said tube to show the innermost position of the disperse phase of said solution.

10. An analytical centrifuge having, in combination, a darkened chamber, a closed transparent tube in said chamber, means for directing a narrow sheet of light into said chamber, means for revolving said tube through said sheet of light.

11. An analytical centrifuge having, in combination, a head, an arm carried by said head and having a longitudinal slot, an elongated tube carried in said arm and adapted to contain a colloid, means for revolving said head, and graduations on said tube for indicating the variable concentration of the disperse phase at different points along the tube.

12. An analytical centrifuge having, in combination, means for subjecting a colloidal material to centrifugal force, and means for indicating at all times while said first mentioned means is operative the relative distribution of the particles constituting the disperse phase toward the outer limit of the dispersion medium.

13. An analytical centrifuge having, in combination, means for subjecting a colloidal material to centrifugal force, and means for periodically passing a beam of light through said substance to show the position of the particles constituting the disperse phase.

14. A process for studying colloidal substances comprising subjecting the substance to centrifugal force, and directly measuring while said force is being applied the rate at which the particles constituting the disperse phase move outwardly in said dispersion medium.

15. A process for studying colloidal substances comprising subjecting the substance to centrifugal force, and directly measuring while said force is being applied the relative distribution of the particles constituting the disperse phase in said dispersion medium.

16. A process for studying colloidal substances comprising placing said substance in a transparent container, revolving said container at a high speed to subject said substance to centrifugal force, periodically illuminating said substance at a fixed point in its path of revolution, said speed of revolution being such that a continuous image is substantially produced at said fixed point, and measuring said image while said substance is subjected to said centrifugal force to measure the relative distribution of the particles constituting the disperse phase in said dispersion medium.

In testimony whereof we have hereunto affixed our signatures.

THEODOR SVEDBERG.
JAMES B. NICHOLS.

---

Certificate of Correction.

Patent No. 1,648,369.      Granted November 8, 1927, to

THEODOR SVEDBERG ET AL.

It is hereby certified that error appears in the printed specification of the above-numbered patent requiring correction as follows: Page 3, line 19, for the word "appear" read *appears;* same page, line 93, claim 1, for the word "centrifugal" read *centrifuge,* and line 112, claim 3, for the word "by", second occurrence, read *to;* and that the said Letters Patent should be read with these corrections therein that the same may conform to the record of the case in the Patent Office.

Signed and sealed this 6th day of December, A. D. 1927.

[SEAL.]      M. J. MOORE,
*Acting Commissioner of Patents.*

Certificate of Correction.

Patent No. 1,648,369.  Granted November 8, 1927, to

THEODOR SVEDBERG ET AL.

It is hereby certified that error appears in the printed specification of the above-numbered patent requiring correction as follows: Page 3, line 19, for the word "appear" read *appears;* same page, line 93, claim 1, for the word "centrifugal" read *centrifuge,* and line 112, claim 3, for the word "by", second occurrence, read *to;* and that the said Letters Patent should be read with these corrections therein that the same may conform to the record of the case in the Patent Office.

Signed and sealed this 6th day of December, A. D. 1927.

[SEAL.]

M. J. MOORE,
*Acting Commissioner of Patents.*